United States Patent
Sodagudi et al.

(10) Patent No.: US 6,987,148 B2
(45) Date of Patent: Jan. 17, 2006

(54) HIGH PERFORMANCE POLYOLEFIN BLENDS FOR INDUSTRIAL PALLETS OTHER ARTICLES AND A PROCESS FOR THE PREPARATION THEREOF

(75) Inventors: Francis Xavier Sodagudi, Gujarat (IN); Pendyala Veera Nageswara Sastry, Gujarat (IN); Bhaskaran Ramasami, Gujarat (IN)

(73) Assignee: Indian Petrochemicals Corporation Limited, Gujarat (IN)

( * ) Notice: Subject to any disclaimer, the term of this patent is extended or adjusted under 35 U.S.C. 154(b) by 0 days.

(21) Appl. No.: 10/165,600

(22) Filed: Jun. 7, 2002

(65) Prior Publication Data

US 2003/0105203 A1    Jun. 5, 2003

(30) Foreign Application Priority Data

Nov. 7, 2001    (IN) .................... 1066/MUM/2001

(51) Int. Cl.
*C08F 8/04*    (2006.01)
(52) U.S. Cl. .................... 525/192; 524/401; 524/425; 525/55; 525/238; 525/240
(58) Field of Classification Search ................ 525/240, 525/55, 192, 238; 524/425, 401
See application file for complete search history.

(56) References Cited

U.S. PATENT DOCUMENTS

| | | | | |
|---|---|---|---|---|
| 4,997,880 A | * | 3/1991 | Van Der Groep | 525/57 |
| 5,404,829 A | | 4/1995 | Shuert | 108/51.1 |
| 5,574,105 A | * | 11/1996 | Venkataswamy | 525/179 |
| 5,621,045 A | * | 4/1997 | Patel et al. | 525/237 |
| 5,635,556 A | * | 6/1997 | Rosenthal | 524/427 |
| 5,679,728 A | * | 10/1997 | Kawazura et al. | 523/215 |
| 5,798,413 A | * | 8/1998 | Spelthann et al. | 525/66 |
| 5,861,463 A | | 1/1999 | Sehanobish et al. | 525/240 |
| 5,955,546 A | | 9/1999 | Bates et al. | 525/240 |
| 6,123,032 A | | 9/2000 | Ohanesian | 108/57.26 |
| 6,125,770 A | | 10/2000 | Brandenburg | 108/57.25 |
| 6,138,532 A | | 10/2000 | McCann | 81/63 |
| 6,140,420 A | | 10/2000 | Sehanobish et al. | 525/124 |
| 6,184,294 B1 | * | 2/2001 | Park et al. | 525/191 |
| 6,211,291 B1 | * | 4/2001 | Rolland et al. | 525/74 |

* cited by examiner

*Primary Examiner*—David W. Wu
*Assistant Examiner*—Henry S. Hu
(74) *Attorney, Agent, or Firm*—Darby & Darby

(57) ABSTRACT

A thermoplastic polyolefin blend comprising of a base polymer and up to 25% by wt of an ethylene propylene diene monomer (EPDM), the balance if any consisting of a conventional filler and/or a conventional compatibilizer or interfacial agent is disclosed. The blend of the present invention is prepared by extruding a base polymer with ethylene propylene diene monomer (EPDM) at a temperature in the range of from 150 to 230° C. The blends of the invention exhibit very high mechanical properties at moderate concentrations of EPDM and/or filler, and can be made into industrial pallets either by injection molding or by thermoforming.

19 Claims, No Drawings

HIGH PERFORMANCE POLYOLEFIN BLENDS FOR INDUSTRIAL PALLETS OTHER ARTICLES AND A PROCESS FOR THE PREPARATION THEREOF

FIELD OF INVENTION

The present invention relates to high performance polypropylene copolymer blends and a process for the preparation thereof. The compounds of this invention exhibit very high mechanical properties at moderate concentrations of EPDM and/or filler, and can be made into industrial pallets either by injection molding or by thermoforming. The process is ideally carried out employing a corotating twin-screw extruder.

BACKGROUND OF THE INVENTION

Pallets have assumed an indispensable place in product storing and transferring in many industries. Traditionally pallets are made up of wood, weighing at least 50 kg. each with an average life span of 6–9 months. These pallets during the industrial rigors of rough handling, chip off, break down, expose the nails which would tear off the bags leading to the generation of sweep-off grade (polymer granules) materials. During rainy seasons, if wooden pallets get wet with water, resulting in weakening of their performance and reduction in their life span. Wood is also a good substrate for the growth of fungus and bacteria, especially under moist conditions, which is a severe disadvantage. The nails used in the pallets tend to rust and can cause cargo damage or injuries.

With the increasing environment responsibility, wooden pallets are gradually discouraged and may be eventually discarded. Attempts to form pallets from other materials in order to avoid the disadvantages inherent in wooden pallets have been only partially successful. Metallic pallets, which were once considered to be ready alternatives for wooden pallets, were soon found to be unwieldy, inconvenient and even unsafe, because of their heavy weight and tendency to cause noise while in use in bagging sections. Accordingly, metallic pallets are gradually becoming unacceptable in the industry.

Plastic pallets, both thermoset as well as thermoplastic, made their modest entry into this high demanding, rough and tough application. The plastic pallet performance is influenced mainly by two factors 1) the performance properties of the pallet material and 2) the design of the pallet. The thermoset pallets, particularly the FRP pallets, chip off during use and bend heavily under load (of nearly 2 tons) leading to problems for entry of forklift. Hence these too are unacceptable and are discouraged. Thus, there is an urgent need for a thermoplastic pallet capable of meeting the demands of the industry. It is also desirable that pallets meet the long-term investment value such as cost-per-use and life cycle considerations. Thus, there is an immediate need for a pallet design comprising a plastic material that overcomes the disadvantages of the prior art. It is desirable, specifically, to provide a pallet that is inexpensive and relatively light in weight but yet strong, and which is formed of recyclable material, stackable, capable of being assembled on site, capable of being picked up by a fork lift, resistant to the growth of fungus and bacteria, and capable of being easily cleaned whenever required.

Several attempts have been made for developing load bearing thermoplastic pallets. U.S. Pat. No. 5,955,546 (1999) issued to Bates et al., describes a process for preparing melt-miscible polyolefin blends of two or more polyolefins. U.S. Pat. No. 5,861,463 (1999) and U.S. Pat. No. 6,140,420 (2000) issued to Sehanobish et al., describe methods for making melt processable impact-modified thermoplastic compositions and articles fabricated therefrom. Another U.S. Pat. No. 5,404,829 (1995) issued to Shuert, provides a design for rackable plastic pallet with an upper plastic platform and lower plastic base interconnected by leg or strut structures. Another U.S. Pat. No. 6,123,032 (2000) issued to Ohenesian, describes an improved load bearing pallet including at least an upper deck formed of a sheet preferably of plastic with a load engaging surface on one side of the sheet and a lift engaging surface on the other. In another U.S. Pat. No. 6,138,532 (2000) issued to Fujii et al., a synthetic resin pallet and manufacturing method therefor was described. And yet in another U.S. Pat. No. 6,125,770 (2000) issued to Bradenburg, a load-bearing plastic pallet with optional reinforcement members, which reduce a flexure of the pallet deck, was illustrated.

OBJECTS OF THE INVENTION

It is an object of the invention to provide high performance thermoplastic polyolefin compounds that allow injection molding, compression molding, thermoforming and other conventional techniques to be applied for making industrial pallets or other end products such as crates, auto parts, furniture, storage and transport containers and seats for motorcycles.

It is another object of the invention to provide a process for preparing high performance thermoplastic polyolefin compounds that exhibit very high mechanical properties.

It is yet another object of the invention to provide an improved process for the preparation of high performance thermoplastic polyolefin compounds that exhibit very high mechanical properties.

It is yet another object of the invention to provide an improved process for the preparation of high performance thermoplastic polyolefin compounds which overcomes the disadvantages of the prior art pallets.

SUMMARY OF THE INVENTION

The above and other objects of the present invention are achieved by providing high performance thermoplastic polyolefin compounds which by blending together a polyolefin copolymer, preferably, a polypropylene copolymer (PPCP) with ethylene propylene diene monomer (EPDM).

In particular, the invention provides a process for preparation of polyolefin copolymers, preferably, polypropylene copolymer blends with EPDM and/or talc or $CaCO_3$ extruded together in a twin-screw extruder while the temperature of the extruder is maintained in the range of 150–210° C., and the screws are rotated at a speed of 20–100 r.p.m.

Accordingly, the present invention provides a thermoplastic polyolefin blend which comprises of a base polymer and up to 25% by wt of an ethylene propylene diene monomer (EPDM), the balance if any consisting of a conventional filler and/or a conventional compatibilizer or interfacial agent.

The present invention also provides a process for the preparation of thermoplastic polyolefin blends which comprises extruding a base polymer with ethylene propylene diene monomer $(EPDM)_{13}$ at a temperature in the range of from 150 to 210° C.

A thermoplastic polyolefin blend comprising of a base polymer and up to 25% by wt of an ethylene propylene diene monomer (EPDM), the balance if any consisting of a conventional filler and/or a conventional compatibilizer or interfacial agent is disclosed. The blend of the present invention is prepared by extruding a base polymer with ethylene propylene diene monomer (EPDM)$_{13}$ at a temperature in the range of from 150–230° C. The blends of the invention exhibit very high mechanical properties at a moderate concentration of EPDM and/or filler, and can be made into industrial pallets either by injection molding or by thermoforming.

In one embodiment of the invention, the polypropylene copolymer has a melt flow index in the range: 1–4 g/10 min. when tested at 230° C. with 2.16 kg load (according to ASTM D1238); and ethylene propylene diene monomer (EPDM) has an ethylene content in the range: 55–65 wt %, possessing specific gravity in the range: 0.86–0.90; and Mooney viscosity in the range: 36–77 [ML$_{(1+4)}$ 125° C.].

In an embodiment of the invention, the compounds possess an Izod impact strength (notched samples) in the range: 14–80 kg.cm/cm for samples of thickness 3.2 mm and 10–70 kg.cm/cm for samples of thickness 6.4 mm (according to ASTM D256).

In another embodiment of the invention, the compounds exhibit tensile strength at yield in the range: 150–250 kg/cm$^2$ when tested according to ASTM D638.

In a further embodiment of the invention, the compounds exhibit flexural strength in the range: 200–400 kg/cm$^2$ and flexural modulus in the range: 9,000–19,000 kg/cm$^2$ when tested according to ASTM D790.

In yet another embodiment of the invention, the compounds exhibit heat deflection temperature in the range of 60 to 110° C. when tested under a stress of 4.6 kgf. and 40 to 70° C. under 18.2 kgf. according to ASTM D648.

In another embodiment of the invention, EPDM was used in the range of up to 0–25 wt % with calcium carbonate, talc or mica in the range of 0–25 wt %.

In a further embodiment of the invention, the filler particle average size was in the range: 5–30 microns.

In yet another embodiment of the invention, the filler particles were surface treated with an organic coupling agent so as to promote adhesion between base polymer and the filler particles.

Preferably, the base polymer is a polypropylne copolymer (PPCP), more preferably, a block or random copolymer of propylene and ethylene.

In a preferred embodiment, said extrusion is carried out in the presence of at least one conventional compatibilizer/interfacial agent. Preferably, said conventional compatibilizer/interfacial agent comprises a copolymer with at least one monomer as acrylonitrile present in a concentration of 0–10 wt %.

DETAILED DESCRIPTION OF THE INVENTION

The present invention was carried out with a polyolefin polymer, preferably with polypropylene copolymer obtained in the form of granules that are stabilized with adequate doses of stabilizers and antioxidants. The granules are pre-dried at 80±5° C. for two hours. EPDM either in neat granules form or in the form of master batch granules, separately prepared with another suitable polyolefin, was also dried, separately, at 80±5° C. for 2 hours. Similarly, a filler, such as calcium carbonate, talc or mica, preferably with an average particle size in the range: 5–30 microns was also dried at 80±5° C. for 2 hours.

Processing conditions of the extruder, (such as the temperature profile, the screw speed), the polymer/polymers mix, feed rate and the screw design profoundly influence the blends' morphology and the blends' properties. A judicious selection of these processing conditions would help in getting optimum results. Apart from these, the blends' properties are sensitive to even the sequence of mixing the ingredients in the extruder. The extrudate coming out of the extruder can be in the form of one, two or more strands. These continuous extrudates are cooled in a trough of circulating water and are granulated after drying.

The twin-screw extruder is designed with a preferred screw profile that would favor an intense mixing of the ingredients in the extruder.

In the present invention, the granules from the extruded compounds are made free from moisture and are used to injection mold into ASTM standard test specimens for evaluating various properties, primarily, tensile, flexural, Izod impact, heat deflection temperature etc. Granules, free from moisture, are also used to measure melt flow index, crystallization kinetics (using differential scanning calorimeter), filler content (using thermo gravimetric analyzer) dispersion of EPDM and filler (using polarized optical microscope) etc.

Injection molding is one process through which the prepared composite granules are shaped into a desired object or standard specimens for evaluating various properties as well as micro-structural details, such as filler dispersion, EPDM dispersion, filler-matrix interaction etc. In the present invention, compounds prepared in the preferred extruder are injection molded into standard ASTM test specimens.

Injection molding is carried out using computer controlled injection molding machine (FRK-85), Klockner-Windsor) with temperature profile in the range: 140–200° C. injection pressure in the range: 2.3–40 sec., (applied in six different stages) with screw speed, (in two stages), in the range: 90–105 rpm. The standard test specimens, thus obtained were tested following the ASTM standard test methods.

The present invention will now be described in terms of the preferred embodiments, with reference to the following non-limiting examples. However, it is to be understood that various alterations and modifications will be possible within the scope and spirit of the present invention.

EXAMPLE-1

Pre-dried granules of the preferred polyolefin copolymer, viz., polypropylene copolymer were mixed with 5 wt % of dehumidified filler, CaCO$_3$ and the homogeneous mixture was divided into two equal parts. To one part dried EPDM was added by 10 wt % and the mixture was extruded in a co-rotating twin-screw extruder with a suitable screw design. The extrusion was carried out at 200° C. with screw rotating at 40 r.p.m. The extrudate compound strand (referred to as Compound A) coming out of the extruder was dipped in a trough of circulating water. Subsequently, the strand was dried and granulated.

The remaining part of the polymer premix (from the above) was further mixed with 15 wt % of dry EPDM and extruded while all the other conditions were maintained as indicated above. The prepared compound (referred to as Compound B) was dried and granulated as above. The compound granules in both these cases were molded using an injection molding machine. The compounds were processed under identical conditions as given in Table-I.

TABLE I

Injection Molding Conditions for Preparation of ASTM Test Specimens

| S. NO. | Processing Parameter | Unit | Set Value |
|---|---|---|---|
| 1 | Injection Pressure | kg/cm$^2$ | 75–125 |
| 2 | Injection Speed | mm/sec. | 6–10 |
| 3 | Temperature Maintained | °C. | 140–200 |
| 4 | Injection Time | sec. | 2–6 |
| 5 | Cooling Time | Sec | 40–70 |
| 6 | Screw Speed | rpm | 90–105 |

Typical properties of the compounds injection molded under the above conditions (Table-I) are shown in Table-II below.

TABLE II

Typical Properties of Compounds A and B

| | Property | Units | ASTM Method | COMPOUNDS A | COMPOUNDS B |
|---|---|---|---|---|---|
| 1 | Melt flow index | g/10 min | D1238 | 3.1 | 2.5 |
| 2 | Tensile strength | kg/cm$^2$ | D638 | 200 | 165 |
| 3 | Tensile modulus | kg cm$^2$ | D638 | 14,340 | 11,308 |
| 4 | Flexural strength | kg/cm$^2$ | D790 | 287 | 223 |
| 5 | Flexural modulus | kg/cm$^2$ | D790 | 15,987 | 12321 |
| 6 | Notched Izod impact strength | Kg.cm/cm | D256 | | |
| | 3.2 mm thick specimen* | | | 64 | 79 |
| | 6.4 mm thick specimen | | | 47 | 65 |
| 7 | Heat deflection temperature | °C. | D648 | | |
| | at 4.6 kgf stress | | | 93 | 88 |
| | at 18.2 kgf stress | | | 49 | 49 |

(*middle portion of the injection molded ASTM standard tensile specimen was used)

EXAMPLE-2

Dry granules of preferred polyolefin copolymer, viz., polypropylene copolymer, were mixed with 5 wt % EPDM granules and the homogeneous mixture so obtained was divided into two equal parts. To one part of the mix, 15 wt % of CaCO$_3$ (a natural filler) was added and the dry mixture was made homogeneous and then extruded using the extruder operating under the conditions mentioned in Example-1. The extrudate (referred to as compound C) was dipped in a trough of circulating water and then granulated as in Example-1.

The remaining part of the homogeneous mixture of the base polymer and EPDM was further mixed with 20 wt % of the same filler and the dry mix was made homogeneous and then extruded, keeping the extruder conditions identical as above. The granules of this extruded compound (referred to as compound D) were also prepared in the same fashion as was described in case of compound C. The granules of both these compounds were molded into standard ASTM specimens, setting injection molding parameters as mentioned in Table-I.

The typical properties of the compounds C and D, measured using injection molded specimens, are given in Table-III.

TABLE III

Typical Properties of Compounds C and D

| | Property | Units | ASTM Method | COMPOUNDS C | COMPOUNDS D |
|---|---|---|---|---|---|
| 1 | Melt flow index | g/10 min | D1238 | 3.0 | 2.5 |
| 2 | Tensile strength | kg/cm$^2$ | D638 | 168 | 166 |
| 3 | Tensile modulus | kg cm$^2$ | D638 | 12,073 | 12,461 |
| 4 | Flexural strength | kg/cm$^2$ | D790 | 243 | 225 |
| 5 | Flexural modulus | kg/cm$^2$ | D790 | 12,570 | 13,153 |
| 6 | Notched Izod impact strength | kg.cm/cm | D256 | | |
| | 3.2 mm thick specimen* | | | 64 | 76 |
| | 6.4 mm thick specimen | | | 46 | 61 |
| 7 | Heat deflection temperature | °C. | D648 | | |
| | at 4.6 kgf stress | | | 84 | 90 |
| | at 18.2 kgf stress | | | 49 | 45 |

(*middle portion of the injection molded ASTM standardized tensile specimen was used)

EXAMPLE-3

Dried granules of preferred polyolefin copolymer, viz., polypropylene copolymer obtained in the form of block copolymer, was mixed with 12 wt % EPDM dried granules and 20 wt % CaCO$_3$ as filler. The dry mixture was extruded keeping the same extruder conditions as mentioned in Example-1. The extrudate (referred to as Compound E) was cooled in water, dried and granulated as in above example.

In a separate experiment the polyolefin base polymer, in the form of a random copolymer, was mixed with identical quantities of other ingredients as explained above in this example, and was extruded in the same manner. The extrudate (referred to as compound F) was cooled in water, dried and granulated as above. The granules of both the compounds E and F were injection molded separately under the same injection molding conditions as mentioned in Table I.

The typical properties of the compounds E and F, measured using the injection molded specimens, are given in Table-IV.

TABLE IV

Typical Properties of Compounds E and F

| | Property | Units | ASTM Method | COMPOUNDS E | COMPOUNDS F |
|---|---|---|---|---|---|
| 1 | Melt flow index | g/10 min | D1238 | 3.8 | 3.6 |
| 2 | Tensile strength | kg/cm$^2$ | D638 | 242 | 223 |
| 3 | Tensile modulus | kg/cm$^2$ | D638 | 17,509 | 14,864 |
| 4 | Flexural strength | kg/cm$^2$ | D790 | 345 | 312 |
| 5 | Flexural modulus | kg/cm$^2$ | D790 | 18,350 | 16,423 |
| 6 | Notched Izod impact strength | kg.cm/cm | D256 | | |
| | 3.2 mm thick specimen* | | | 15 | 21 |
| | 6.4 mm thick specimen | | | 11 | 17 |

TABLE IV-continued

Typical Properties of Compounds E and F

| | Property | Units | ASTM Method | COMPOUNDS E | COMPOUNDS F |
|---|---|---|---|---|---|
| 7 | Heat deflection temperature at | °C. | D648 | | |
| | 4.6 kgf stress | | | 110 | 90 |
| | 18.2 kgf stress | | | 55 | 45 |

(*middle portion of the injection molded ASTM standardized tensile specimen was used)

EXAMPLE-4

Base polymer was mixed with 25 wt % EPDM and the mixture was divided into two equal parts. To one part, 20 wt % of talc (a natural filler) of average particle size of 10 microns was added and then extruded, under the same extrusion conditions as in Example 1. The extrudate (referred to as compound G) was cooled in water, dried and granulated as in the above examples.

Separately, to the remaining part of the base polymer and EPDM mixture, the same natural filler, used above, with an average particle size of 20 microns, but of the same concentration as above was added. The mixture was homogenized and then extruded under the same extrusion conditions as in the above experiment. The extrudate (referred to as compound H) was cooled in water, dried and granulated as in the above experiment.

Both the compounds G and H were dried and injection molded into ASTM standard specimens under the same injection molding conditions mentioned above in Table I. The typical properties of compounds G and H, measured using the injection molded specimens are given in Table V.

TABLE V

Properties of Compounds G and H

| | Property | Units | ASTM Method | COMPOUNDS G | COMPOUNDS H |
|---|---|---|---|---|---|
| 1 | Melt flow index | g/10 min | D1238 | 2.6 | 4.3 |
| 2 | Tensile strength | kg/cm² | D638 | 163 | 169 |
| 3 | Tensile modulus | kg/cm² | D638 | 10,363 | 10,491 |
| 4 | Flexural strength | kg/cm² | D790 | 221 | 231 |
| 5 | Flexural modulus | kg/cm² | D790 | 11,515 | 10,801 |
| 6 | Notched Izod impact strength | kg.cm/cm | D256 | | |
| | 3.2 mm thick specimen* | | | 72 | 67 |
| | 6.4 mm thick specimen | | | 71 | 52 |
| 7 | Heat deflection temperature | °C. | D648 | | |
| | at 4.6 kgf stress | | | 86 | 80 |
| | at 18.2 kgf stress | | | 53 | 48 |

(*middle portion of the injection molded ASTM standard tensile specimen was used)

EXAMPLE-5

In another experiment, a dry mixture of the base polyolefin polymer, EPDM (10 wt %) and natural filler (talc, 10 wt %) was prepared and was divided into two equal parts. One part was extruded as it is while the extruder conditions were maintained the same as mentioned above in Example-1. The extrudate (referred to as compound I) was cooled in water, dried and granulated as in the above examples.

Separately, to the remaining part of the mixture from the above experiment, a compatibilizer/interfacial agent comprising of styrene-acrylonitrile copolymer in an amount of 10% by weight (with respect to the mixture) was added. The mixture with the compatibilizer was also extruded under identical conditions of the extruder as mentioned above. The extrudate (referred to as compound J) was cooled in water, dried and granulated as in the above examples.

Both the compounds I and J were dried and injection molded into ASTM standard specimens under the same injection molding conditions mentioned above in Table I. The typical properties of compounds I and J, measured using the injection molded specimens are given in Table VI.

TABLE VI

Typical Properties of Compounds I and J

| | Property | Units | ASTM Method | COMPOUNDS I | COMPOUNDS J |
|---|---|---|---|---|---|
| 1 | Melt flow index | g/10 min | D1238 | 8.5 | 3.0 |
| 2 | Tensile strength | kg/cm² | D638 | 167 | 187 |
| 3 | Tensile modulus | kg/cm² | D638 | 8,990 | 13,825 |
| 4 | Flexural strength | kg/cm² | D790 | 231 | 250 |
| 5 | Flexural modulus | kg/cm² | D790 | 9,843 | 13,610 |
| 6 | Notched Izod impact strength | kg.cm/cm | D256 | | |
| | 3.2 mm thick specimen* | | | 13 | 30 |
| | 6.4 mm thick specimen | | | 10.5 | 22 |
| 7 | Heat deflection temperature | °C. | D648 | | |
| | at 4.6 kgf stress | | | 70 | 104 |
| | at 18.2 kgf stress | | | 42 | 60 |

(*middle portion of the injection molded ASTM standard tensile specimen was used)

We claim:

1. A thermoplastic polyolefin blend having a flexural strength in the range of 200 to 400 Kg/cm² and a flexural modulus in the range of 9,000 to 19,000 Kg/cm² when tested according to ASTM D790 which comprises a base polymer and up to 25% by wt of total blend composition of a terpolymer made from an ethylene propylene diene monomer (EPDM) and, a filler must be present and in an amount of equal to or less than 25 wt % and optionally a compatibilizer/interfacial agent, wherein said compatabilizer/interfacial agent comprises a copolymer wherein at least one monomer is acrylonitrile; and wherein the particle size of said filler is in the range of 5 to 30 microns.

2. A blend as claimed in claim 1 wherein said base polymer is a polypropylene copolymer (PPCP).

3. A thermoplastic polyolefin blend as claimed in claim 1 wherein said base polymer is a block or random copolymer of propylene and ethylene.

4. A thermoplastic polyolefin blend as claimed in claim 1 wherein said (EPDM) has an ethylene concentration in the range of 55 to 65 wt %, specific gravity in the range of 0.86 to 0.90 and Mooney viscosity in the range: 36 to 77 [$ML_{(1+4)}$ 125° C.].

5. A thermoplastic polyolefin blend as claimed in claim 1 wherein said filler is a natural filler selected from the group consisting of calcium carbonate, talc and mica.

6. A thermoplastic polyolefin blend as claimed in claim 1 wherein said fillers are surface treated to provide good adhesion between filler and the base polymer.

7. A thermoplastic polyolefin blend as claimed in claim 1 wherein said compatibilizer/interfacial agent is present in a concentration of 0–10 wt %.

8. A thermoplastic polyolefin blend as claimed in claim 1 having an Izod impact strength (notched samples) in the range: 10 to 80 kg.cm/cm for samples of thickness 3.2 mm and 10–70 kg.cm/cm for samples of thickness 6.4 mm (according to ASTM D256).

9. A thermoplastic polyolefin blend as claimed in claim 1 having a tensile strength at yield in the range: 150–250 kg/cm$^2$ when tested according to ASTM D638.

10. A thermoplastic polyolefin blend as claimed in claim 1 having a heat deflection temperature in the range of from 60 to 110° C. when tested under a stress of 4.6 kgf, and 40 to 70° C. under 18.2 kgf according to ASTM D648.

11. A process for the preparation of thermoplastic polyolefin blends having a flexural strength in the range of 200 to 400 Kg/cm$^2$ and a flexural modulus in the range of 9,000 to 19,000 Kg/cm$^2$ when tested according to ASTMD790 which comprises extruding at a temperature in the range from 150 to 230° C. in a co-rotating twin screw extruder a base polymer and up to 25% by wt of total blend composition with a termonomer made from ethylene propylene diene monomer (EPDM) along with a filler must be present and in an amount of equal to or less than 25 wt and optionally a compatibilizer/interfacial agent, wherein said compatabilizer/interfacial agent comprises a copolymer wherein at least one monomer is acrylonitrile; and wherein the particle size of said filler is in the range of 5 to 30 microns.

12. A process as claimed in claim 11 wherein said base polymer is a polypropylene copolymer (PPCP).

13. A process as claimed in claim 11 wherein said base polymer is a block or random copolymer of propylene and ethylene.

14. A process as claimed in claim 11 wherein the amount of said EPDM is not more than 25 % by wt of the blend.

15. A process as claimed in claim 14 wherein said EPDM has an ethylene concentration in the range of 55 to 65 wt % specific gravity in the range of 0.86 to 0.90 and Mooney viscosity in the range: 36 to 77 [$ML_{(1+4)}$) 125° C.].

16. A process as claimed in claim 11 wherein said extrusion is carried out in a corotating twin screw extruder with the screws rotating at a speed of from 20 to 100 rpm.

17. A process as claimed in claim 11 wherein said filler is a natural filler selected from the group consisting of calcium carbonate, talc and mica.

18. A process as claimed in claim 11 wherein said fillers are surface treated to provide good adhesion between filler and the base polymer.

19. A process as claimed in claim 11 wherein said compatibilizer/interfacial agent is present in a concentration of up to 10 wt %.

* * * * *